(12) United States Patent
Fuke et al.

(10) Patent No.: US 7,376,300 B2
(45) Date of Patent: May 20, 2008

(54) VARIABLE OPTICAL DISPERSION COMPENSATING MODULE

(75) Inventors: Nobutaka Fuke, Tokyo (JP); Shiro Nakamura, Tokyo (JP); Jun Ishiguro, Tokyo (JP); Hiroshi Raijo, Tokyo (JP); Atsushi Umeda, Tokyo (JP)

(73) Assignee: Furukawa Electric Co., Ltd. (JP)

( * ) Notice: Subject to any disclaimer, the term of this patent is extended or adjusted under 35 U.S.C. 154(b) by 0 days.

(21) Appl. No.: 11/112,532

(22) Filed: Apr. 22, 2005

(65) Prior Publication Data

US 2005/0191018 A1 Sep. 1, 2005

Related U.S. Application Data

(63) Continuation of application No. 10/146,215, filed on May 15, 2002, now abandoned.

(30) Foreign Application Priority Data

May 16, 2001 (JP) ............................. 2001-146591
May 1, 2002 (JP) ............................. 2002-130112

(51) Int. Cl.
*G02B 6/26* (2006.01)
(52) U.S. Cl. .......................................... 385/27; 385/16
(58) Field of Classification Search ................. 385/16, 385/27, 39, 123, 140
See application file for complete search history.

(56) References Cited

U.S. PATENT DOCUMENTS 5,608,562 A 3/1997 Delavaux et al.

| | | | |
|---|---|---|---|
| 6,281,998 B1 | 8/2001 | Jones et al. | |
| 6,546,180 B1 | 4/2003 | Koyano et al. | |
| 6,583,907 B1 | 6/2003 | Essiambre | |
| 2002/0027703 A1 | 3/2002 | Kinoshita et al. | |

FOREIGN PATENT DOCUMENTS

| | | | |
|---|---|---|---|
| CN | 1232192 A | | 10/1999 |
| JP | 61-243340 | | 10/1986 |
| JP | 7-281215 | | 10/1995 |
| JP | 10-41891 | | 2/1998 |
| JP | 11-252010 | | 9/1999 |
| JP | 11-252010 A | | 9/1999 |
| JP | 2000-072329 | | 3/2000 |
| JP | 2001322767 A | * | 11/2001 |

OTHER PUBLICATIONS

Chinese Office Action for Application No. 02140116.0 dated Dec. 8, 2006.
Notice of Reasons for Rejection; Patent Application No. 2002-130112; Mailing Date: Sep. 4, 2007.

* cited by examiner

*Primary Examiner*—Sarah Song
(74) *Attorney, Agent, or Firm*—Cantor Colburn LLP (57) ABSTRACT

The present invention provides a variable optical dispersion compensating module comprised of (a) an optical dispersion compensating unit having an input optical switch, an optical dispersion compensating fiber, connected to the optical switch, having a predetermined optical dispersion amount, a bypass path for bypassing the optical dispersion compensating fiber, and an output optical switch connected to the optical dispersion compensating fiber and the bypass path, (b) an optical dispersion compensating circuit with at least one of the unit connected in series, and (c) an optical attenuator provided, in the direction of an optical path, after the input optical switch or before the output optical switch of the optical dispersion compensating circuit.

10 Claims, 7 Drawing Sheets

VARIABLE OPTICAL DISPERSION COMPENSATING MODULE

CROSS-REFERENCE TO RELATED APPLICATION

This application is a continuation of U.S. patent application Ser. No. 10/146,215, filed May 15, 2002, now abandoned which claims the benefit of the filing dates of May 16, 2001 to Japanese Application No. 2001-146591, and May 1, 2002 to Japanese Application No. 2002-130112, under provisions of 35 U.S.C. 119 and the International Convention for the protection of Industrial Property, the entire contents of which are incorporated herein by reference.

FIELD OF THE INVENTION

The present invention relates to a variable optical dispersion compensating module used in an optical communication field, and more particularly, to a variable optical dispersion compensating module used in a WDM (Wavelength Division Multiplexing) communication system.

DESCRIPTION OF THE RELATED ART

In a long-distance transmission using an optical fiber, since wavelength dispersion occurs due to the optical fiber, it is required to compensate the wavelength dispersion. In particular, when a signal band system already installed with single mode fiber (hereinafter referred to as "SM fiber") is applied to a WDM communication system the compensation of the wavelength dispersion becomes important, since the wavelength dispersion due to the optical fiber is increased.

As a means for compensating the wavelength dispersion due to the optical fiber, an optical dispersion compensating module is installed which has an optical dispersion compensating fiber (hereinafter referred to as "DC fiber") with negative wavelength dispersion characteristics that is inverse to wavelength dispersion characteristics of the SM fiber composing a main part of a transmission path. The module cancels the wavelength dispersion occurring in the SM fiber using the wavelength dispersion of the DC fiber.

However, the dispersion amount to be compensated using such an optical dispersion compensating module differs for each optical path (transmission path), and is not determined until a final stage of construction of the optical fiber. Therefore, a customer is prevented from reducing the construction time, and a manufacturer is required to delivery the module in a short time, thereby to carry heavy burdens. Accordingly, a variable optical dispersion compensating module has been required which enables optical dispersion compensating amount to be adjusted variable.

Japanese Laid-Open Patent Publication No. 11-252010 (1999) discloses an example of a conventional wavelength dispersion compensating apparatus. In the example, dispersion selecting units are coupled in series which are capable of selecting specific dispersion amount such as normal dispersion, abnormal dispersion and zero dispersion with different optical dispersion compensating amount, and an optical amplifier is inserted in between the units. Each of the dispersion selecting units is provided with, at least, an input switch, an output switch, a dispersion equalizing fiber, and an optical attenuator.

Therefore, since it becomes necessary to construct the entire module while adjusting an optical attenuation, a dedicated facility is required and processes are made complicated, resulting in a problem that production cost is increased.

Further, for example, when the DC fiber of the optical dispersion compensating module needs to be exchanged, a variation occurs in a loss caused by new fusion splicing between the fiber and an optical switch even in the case where a loss of the new DC fiber is the same as that of the previous DC fiber, as well as the case where a loss of the new DC fiber is different from that of the previous DC fiber. Therefore, the need arises of installing again a fixed optical attenuator with a re-adjusted optical attenuation. Accordingly, there is another problem that the cost is increased due to exchange of DC fiber.

SUMMARY OF THE INVENTION

An object of the present invention is to provide a variable optical dispersion compensating module to be produced by its simplified production processes and reduced production cost.

A basic concept of the present invention is a variable optical dispersion compensating module provided with following members:

(a) an optical dispersion compensating unit comprising an input optical switch, an optical dispersion compensating fiber being connected to the optical switch and having a predetermined optical dispersion amount, a bypass for bypassing the optical dispersion compensating fiber, and an output optical switch connected to the optical dispersion compensating fiber and the bypass path;

(b) an optical dispersion compensating circuit with at least one of the unit connected in series; and (c) an optical attenuator provided between the input optical switch or the output optical switch of the optical dispersion compensating circuit and an optical connector for input and output.

DETAILED DESCRIPTION OF THE PREFERRED EMBODIMENTS

Embodiments of the present invention will be described below.

A basic embodiment is a variable optical dispersion compensating module provided with following members:

(a) an optical dispersion compensating unit comprising an input optical switch, an optical dispersion compensating fiber being connected to the optical switch and having a predetermined optical dispersion amount, a bypass for bypassing the optical dispersion compensating fiber, and an output optical switch connected to the optical dispersion compensating fiber and the bypass path;

(b) an optical dispersion compensating circuit with at least one of the unit connected in series; and (c) an optical attenuator provided between the input optical switch or the output optical switch of the optical dispersion compensating circuit and an optical connector for input and output.

Another embodiment is a variable optical dispersion compensating module with a single optical switch installed at a midpoint in the bypass path where the single optical switch operates as the input optical switch and the output optical switch.

Another embodiment is a variable optical dispersion compensating module in which with respect to an optical dispersion amount of the optical dispersion compensating fiber composing the at least one of the optical dispersion compensating unit, when an optical dispersion amount of a negative optical dispersion compensating fiber is set at X (negative numeral), an optical dispersion amount of another optical dispersion compensating fiber is set at $2^N \times X$ (N is an integer ranging from 1 to j).

Further, the variable optical dispersion compensating module is provided with a control device that controls switching of an optical path of each optical switch composing the at least one of the optical dispersion compensating unit and an attenuation of the optical attenuator so as to obtain a set predetermined optical dispersion amount and optical attenuation.

Furthermore, in the variable optical dispersion compensating module, the optical dispersion fiber composing the optical dispersion compensating unit is an optical fiber which is set for a predetermined dispersion amount and is wounded around a bobbin having a barrel portion on whose opposite ends are provided flange portions one of which is provided with an insertion portion through which the optical fiber is passed.

Moreover, in the variable optical dispersion compensating module, the optical dispersion fiber composing the optical dispersion compensating unit is an optical fiber which is set for a predetermined dispersion amount and is wounded around a bobbin having a barrel portion on whose opposite ends are provided flange portions and which is comprised of a plurality of support poles and a plurality of expanding/shrinking axes to enable a diameter of the barrel portion to be expanded and shrunk.

Figure 1:
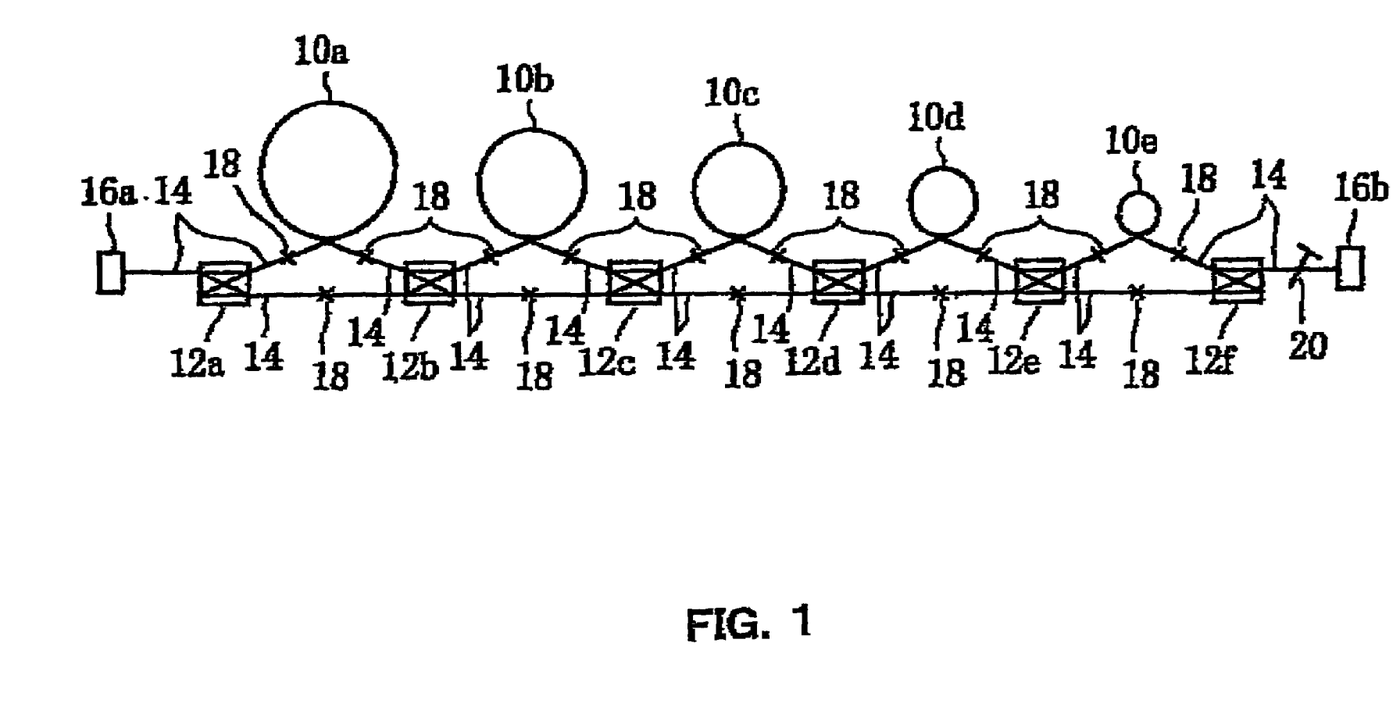
FIG. 1 is a schematic diagram showing a variable optical dispersion compensating module according to a first embodiment of the present invention.

A first embodiment of the present invention will be described below with reference to FIG. 1. FIG. 1 is a schematic diagram showing a variable optical dispersion compensating module according to the first embodiment of the present invention.

As shown in FIG. 1, the variable optical dispersion compensating module according to this embodiment is composed of five optical dispersion compensating units in which five DC fibers 10a to 10e with different optical dispersion compensating amount are connected in series using six optical switches 12a to 12f. Optical dispersion compensating amount of the five DC fibers 10a to 10e is respectively, for example, −160 ps/nm, −80 ps/nm, −40 ps/nm, −20 ps/nm, and −10 ps/nm. As a general rule, with respect to DC fibers, when a negative optical dispersion amount of a specific optical dispersion compensating fiber is set at X (hereinafter X is a negative numeral), an optical dispersion amount of another optical dispersion compensating fibers are set at $2^N \times X$ (N is an integer ranging from 1 to j).

Each of input/output fibers 14 of the six optical switches 12a to 12f is an optical fiber with the same structure as that of the DC fibers 10a to 10e.

With respect to a first unit, the input/output fiber 14 extending from an input of the optical switch 12a is connected to an input connector 16a. Among two input/output fibers 14 extending from an output of the optical switch 12a, one is connected to one end of the DC fiber 10a through a fusion splice 18. The other one is connected to the input/output fiber 14 extending from an input of the optical switch 12b through the fusion splice 18. The other end of the DC fiber 10a is connected to the input/output fiber 14 extending from an input of the optical switch 12b through the fusion splice 18.

Also with respect to a second unit, among two input/output fibers 14 extending from an output of the optical switch 12b, one is connected to one end of the DC fiber 10b through the fusion splice 18. The other one is connected to the input/output fiber 14 extending from an input of the optical switch 12c through the fusion splice 18. The other end of the DC fiber 10b is connected to the input/output fiber 14 extending from an input of the optical switch 12c through the fusion splice 18.

The third to fifth units have the same structure as that of the above two units. Further, the input/output fiber 14 extending from an output of the optical switch 12f of the fifth unit is connected to an output connector 16b.

This embodiment features a single variable optical attenuator 20 that adjusts a loss of the entire variable optical dispersion compensating module installed in a portion of the input/output fiber 14 connecting the optical switch 12f of the fifth unit and the output connector 16b.

As an optical switch, various optical switches such as a mirror type switch may be used, as long as the switch is capable of being set for transferring input light to an optical dispersion compensating fiber or an adjacent optical switch, for example, 12b.

The operation of the variable optical dispersion compensating module in FIG. 1 will be described below.

Corresponding to a required optical dispersion compensating amount, one or more switches are arbitrarily selected from the optical switches 12a to 12f of the variable optical dispersion compensating module for operation, and thereby the optical path is switched so that transmission light is passed through a desired DC fiber(s) selected from the DC fibers 10a to 10e as shown in FIG. 1 with respective optical dispersion compensating amount of, for example, −160 ps/nm, −80 ps/nm, −40 ps/nm, −20 ps/nm, and −10 ps/nm in the direction from the input to the output, which makes an easy selection of the DC fiber depending on the dispersion to be required. Thus, the optical dispersion compensating amount is adjusted in a range from 0 ps/nm to −310 ps/nm on a 10 ps/nm basis.

Then, for example, since an output intensity to the optical connector 16b is generally too high when only the fiber 10e with a small optical dispersion compensating amount is used, the variable optical attenuator 20 adjusts the output intensity to control so that an optical loss of the entire variable optical dispersion compensating module remains constant always whenever the transmission light passes through any route of the optical path.

In other words, for example, when transmission light passes through all the DC fibers 10a to 10e as a route of the optical path, an optical intensity loss of the route is assumed to be A and an attenuation of the variable optical attenuator 20 is 0 (zero). In the case where the transmission light is passed through another route having a bypass path(s), the entire loss is decreased from A by an amount corresponding to a loss of the bypassed optical dispersion compensating fiber. Therefore, the variable optical attenuator 20 provides an attenuation corresponding to a loss in accordance with the bypass loss. Thus, the loss of the entire variable optical dispersion compensating module is always held constantly.

The conventional technique requires the provision of at least the same number of fixed optical attenuators as the number of DC fibers, where the attenuators have respective optical attenuation predetermined for each unit connected in series as one or a plurality of stages. However, according to the variable optical dispersion compensating module according to this embodiment, a single variable attenuator 20 is installed for the entire variable optical dispersion compensating module. Then, the operation of the single variable optical attenuator 20 enables a loss of the entire variable optical dispersion compensating module to be held always at a constant value, and it is thereby possible to greatly decrease the number of optical attenuators to be installed.

Further, in installing the variable optical attenuator 20, since it is not necessary to construct the module using the attenuator while adjusting the optical attenuation unlike in installing the conventional fixed optical attenuates, a dedicated facility or the like is not needed and the process is simplified and resulting in reduced production cost.

Furthermore, when the need arises of exchanging DC fibers of the variable optical dispersion compensating module, it is not necessary to install again an optical attenuator with a newly adjusted optical attenuation unlike the conventional technique. Therefore, it is possible to reduce the cost for exchanging DC fibers.

In addition, in the above first embodiment, the insertion direction (the direction of light) of the variable optical dispersion compensating module in the transmission path is not limited to the direction, as shown in FIG. 1, in which transmission light is incident on the input connector 16a and output from the output connector 16b, and a direction may be possible in which transmission light is incident from the output connector 16b and is output from the input connector 16a.

Moreover, an install portion of the variable optical attenuator 20 is not limited to a portion of the input/output fiber 14 connecting the optical switch 12f of the fifth unit and the output connector 16b. For example, the attenuator 20 may be installed between the input/output fiber 14 connecting the optical switch 12a of the first unit and the input connector 16a.

A second embodiment of the present invention will be described below with reference to FIG. 2.

Figure 2:
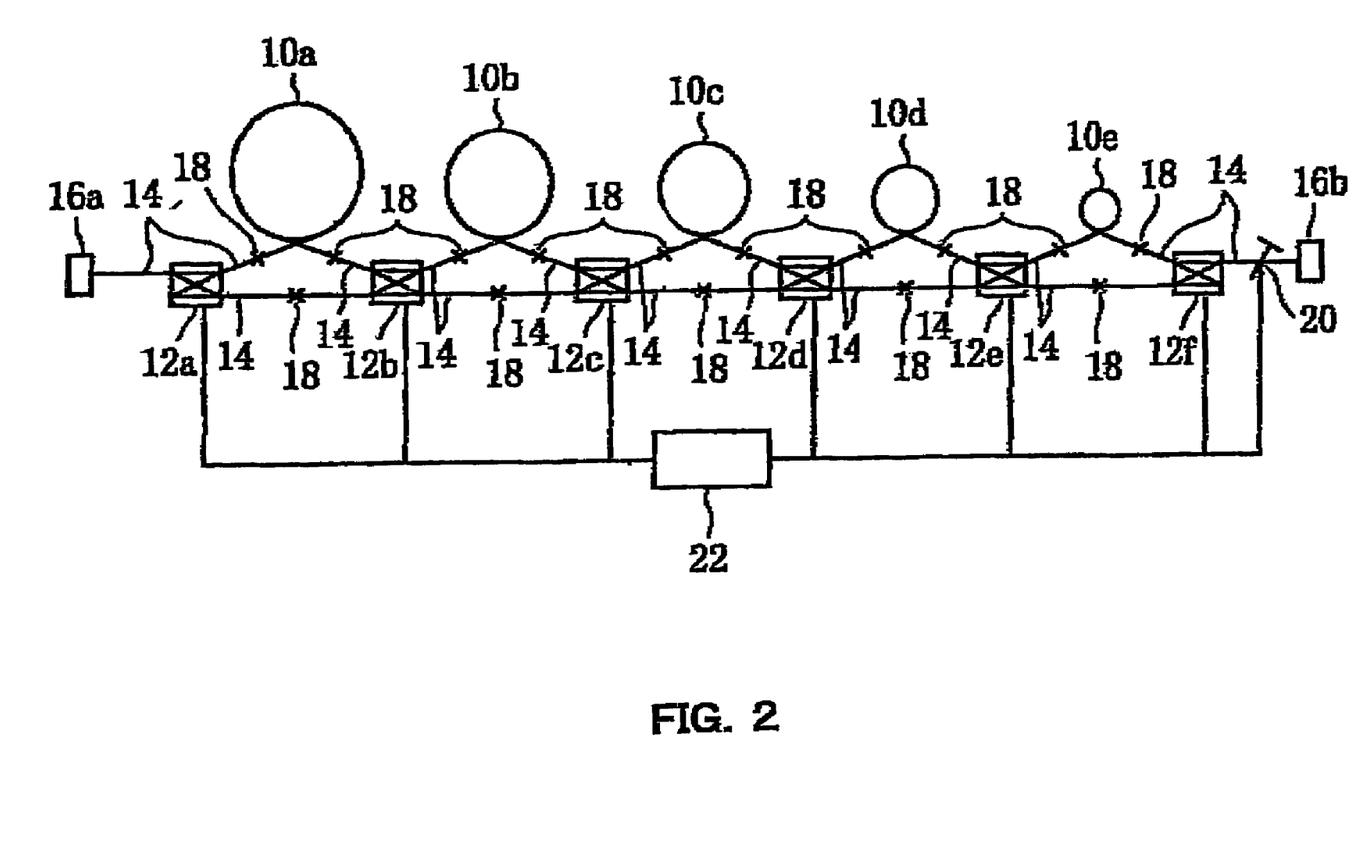
FIG. 2 is a schematic diagram showing a variable optical dispersion compensating module according to a second embodiment of the present invention.

FIG. 2 is a schematic diagram showing a variable optical dispersion compensating module according to the second embodiment of the present invention. In addition, the same structural elements as those of the variable optical dispersion compensating module of the first embodiment shown in FIG. 1 are assigned the same reference numerals as in FIG. 1 to omit the descriptions.

As shown in FIG. 2, the variable optical dispersion compensating module according to this embodiment basically has the same configuration as that of the variable optical dispersion compensating module of the first embodiment as shown in FIG. 1. In other words, five DC fibers 10a to 10e with different optical dispersion compensating amount are connected in series using six optical switches 12a to 12f, while the single variable optical attenuator 20 that adjusts a loss of the entire variable optical dispersion compensating module is installed between the input/output fiber 14 connecting the optical switch 12f and output connector 16b.

In addition, it is a feature of this embodiment that a control device 22 is installed which is connected to each of the six optical switches 12a to 12f and variable optical attenuator 20, calculates a loss of the entire variable optical dispersion compensating module corresponding to switching of each of the optical switches 12a to 12f, and using a calculated result, automatically adjusts the optical attenuation of the variable optical attenuator 20. The control device is connected to each optical switch between the optical switch 12a at the input and the optical switch 12f at the output, and the device measures a dispersion amount of input and output light of each optical switch, selects one or more optical switches as appropriate from among the switches 12a to 12f using a preset dispersion amount as a reference, and thereby automatically controls a dispersion amount.

Further, it is possible to install an optical amplifier at a midpoint in the circuit when the optical intensity attenuates, and it is thereby possible to amplify the optical intensity to an intensity preset by the control device.

The operation of the variable optical dispersion compensating module as shown in FIG. 2 will be described below.

As in the first embodiment, corresponding to a required optical dispersion compensating amount, the optical switches 12a to 12f of the variable optical dispersion compensating module is selectively operated, thereby the optical path is switched so that transmission light is passed through a desired DC fiber(s) among the DC fibers 10a to 10e while bypassing the other DC fibers, and thus the optical dispersion compensating amount is adjusted. At this point, whichever route of the optical path transmission light is passed through, the control device 22 calculates a loss of the entire variable optical dispersion compensating module corresponding to the switching of each of the optical switches 12a to 12f, and based on the calculated result, automatically adjusts the optical attenuation of the variable optical attenuator 20. Thus, the loss of the entire variable optical dispersion compensating module is automatically controlled to be always constant. In other words, the operation of the variable optical attenuator 20 in the variable optical dispersion compensating module in the first embodiment is automatically controlled, and the loss of the entire variable optical dispersion compensating module is always held at a constant value automatically.

According to the variable optical dispersion compensating module according to the second embodiment provided with the control device 22 that thus adjusts an optical attenuation automatically, in addition to the same effect as in the first embodiment, it is possible to automatically control the operation of the variable optical attenuator 20 and to automatically hold a loss of the entire optical dispersion compensating module always at a constant value.

A third embodiment of the present invention will be now described below with reference to FIG. 3.

Figure 3:
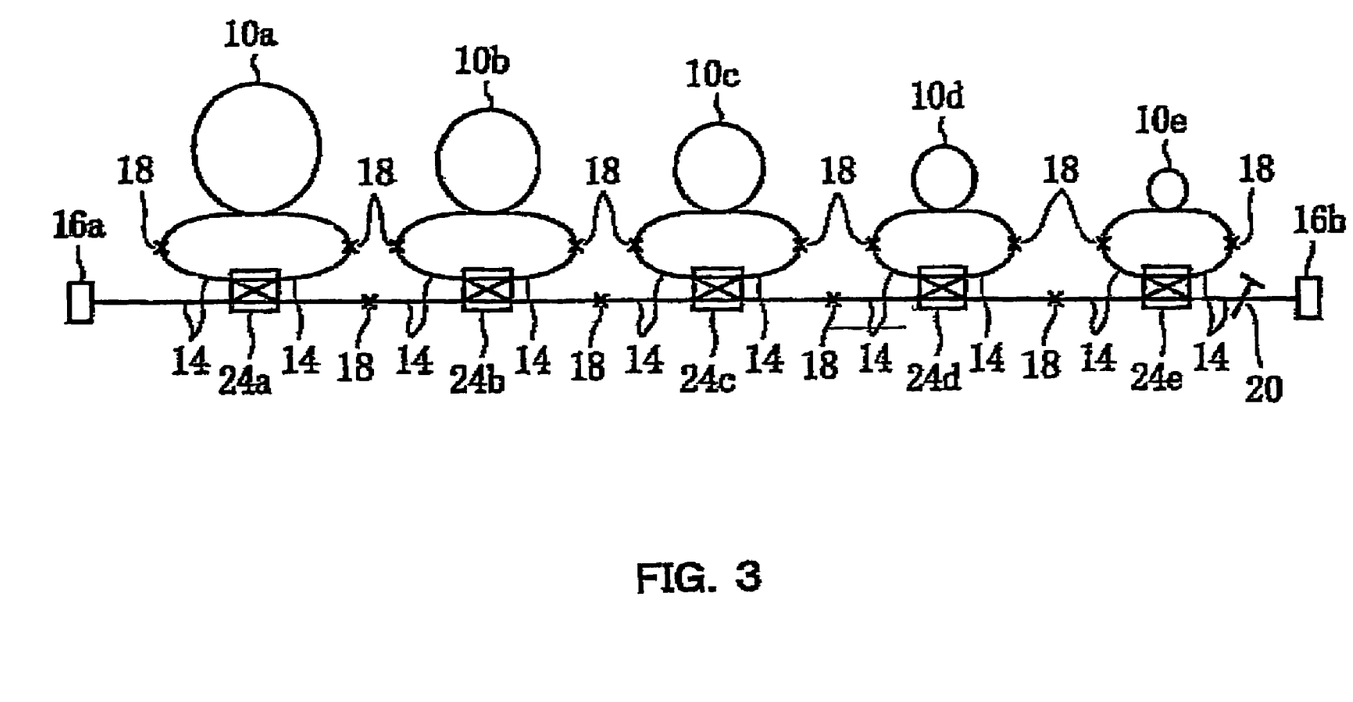
FIG. 3 is a schematic diagram showing a variable optical dispersion compensating module according to a third embodiment of the present invention.

FIG. 3 is a schematic diagram showing a variable optical dispersion compensating module according to the third embodiment of the present invention. In addition, the same structural elements as those of the variable optical dispersion compensating module shown in FIG. 1 in the first embodiment are assigned the same reference numerals as in FIG. 1 to omit the descriptions.

As shown in FIG. 3, the variable optical dispersion compensating module according to this embodiment is composed of five units in which five kinds of DC fibers 10a to 10e with different optical dispersion compensating amount are connected in series using five optical switches 24a to 24f.

In a first unit, among two input/output fibers 14 extending from an input of the optical switch 24a, one is connected to the input connector 16a. The other one is connected to one end of the DC fiber 10a through the fusion splice 18. Further, among two input/output fibers 14 extending from an output of the optical switch 24a, one is connected to the other end of the DC fiber 10a, and the other one is connected to the input/output fiber 14 extending from an input of the optical switch 24b through the fusion splice 18.

The second to fifth units have the same structure as that of the first unit. Further, among the input/output fibers 14 extending from an output of the optical switch 24e of the fifth unit, one is connected to the output connector 16b.

Also in the variable optical dispersion compensating module according to this embodiment, it is a feature that a single variable optical attenuator 20 that adjusts a loss of the entire variable optical dispersion compensating module is provided in a portion of the input/output fiber 14 connecting the optical switch 24e of the fifth unit and the output connector 16b. A difference from the example in FIG. 1 is that the number of optical switches is less than that in FIG. 1 by one, which is preferable in operation and production cost. In other words, this embodiment is the variable optical dispersion compensating module in which a single optical switch operating as both an input optical switch and output optical switch is provided at a midpoint in the bypass path in the example shown in FIG. 1.

In addition, since the operation of the variable optical dispersion compensating module in FIG. 3 is basically the same as in the variable optical dispersion compensating module in FIG. 1 in the first embodiment, description thereof is omitted.

According to the variable optical dispersion compensating module according to this embodiment, as in the first embodiment previously mentioned, since a single variable optical attenuator 20 is installed in the entire variable optical dispersion compensating module, it is possible to always hold a loss of the entire variable optical dispersion compensating module at a constant value. As a result, it is possible to exhibit the same effect as in the variable optical dispersion compensating module according to the first embodiment.

A fourth embodiment of the present invention will be described below with reference to FIG. 4.

Figure 4:
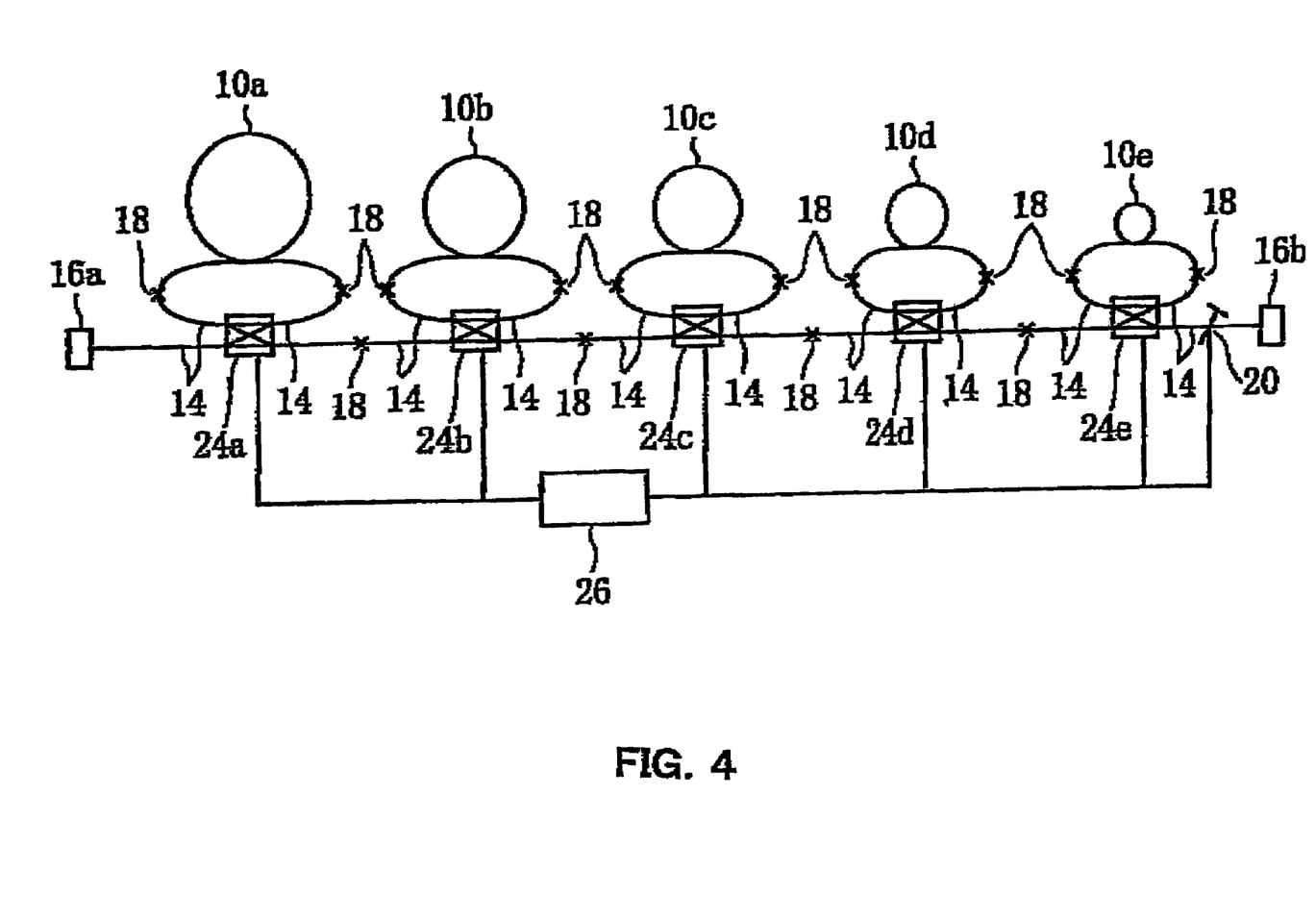
FIG. 4 is a schematic diagram showing a variable optical dispersion compensating module according to a fourth embodiment of the present invention.

FIG. 4 is a schematic diagram showing a variable optical dispersion compensating module according to the fourth embodiment of the present invention. In addition, the same structural elements as those of the variable optical dispersion compensating module shown in FIG. 3 in the third embodiment are assigned the same reference numerals as in FIG. 3 to omit the descriptions.

As shown in FIG. 4, the variable optical dispersion compensating module according to this embodiment basically has the same configuration as that of the variable optical dispersion compensating module in FIG. 3 in the third embodiment. In other words, five DC fibers 10a to 10e with different optical dispersion compensating amount are connected in series using five optical switches 24a to 24e, while the single variable attenuator 20 that adjusts a loss of the entire variable optical dispersion compensating module is installed in a portion of the input/output fiber 14 connecting the optical switch 24e and output connector 16b.

In addition, in this embodiment, as the variable optical dispersion compensating module in FIG. 2 in the second embodiment previously mentioned provided with the control device 22, it is a feature that a control device 26 is installed which is connected to each of the five optical switches 24a to 24e and variable optical attenuator 20, calculates a loss of the entire variable optical dispersion compensating module corresponding to switching of each of the optical switches 24a to 24e, and using a calculated result, automatically adjusts the optical attenuation of the variable optical attenuator 20.

In addition, since the operation of the variable optical dispersion compensating module in FIG. 4 is basically the same as in the variable optical dispersion compensating module shown in FIG. 2 in the second embodiment, description thereof is omitted.

According to the variable optical dispersion compensating module according to this embodiment, the control device 26 is installed which automatically adjusts the optical attenuation of the variable optical attenuator 20 corresponding to switching of each of the optical switches 24a to 24e, whereby it is possible to automatically control the operation of the variable optical attenuator 20 and to always hold a loss of the entire optical dispersion compensating module at a constant value. As a result, it is possible to exhibit the same effect as in the variable optical dispersion compensating module according to the second embodiment.

In the above-mentioned first to fourth embodiments, the module is composed of five optical dispersion compensating units in which five kinds of DC fibers 10a to 10e with different optical dispersion compensating amount are connected in series using six optical switches or five optical switches. Then, while the case is described that there are fourteen or fifteen fusion splices 18 for the DC fibers 10a to 10e composed of optical fibers with the same structure and input/output fibers 14 of the optical switches 12a to 12f or optical switches 24a to 24e, the number of DC fibers, the number of optical switches and the number of fusion splices are not limited to the above case.

Moreover, the optical dispersion compensating amount of each of the DC fibers is not limited to the value as described above, and further is not limited to whether the optical dispersion compensating amount is different from one another, whether the optical dispersion compensating amount is negative values, or the like.

As is apparent from the above description, the variable optical dispersion compensating modules according to the present invention enable the greatly decreased number of optical attenuators to be installed and eliminate the need of constructing the module using one or a plurality of fixed optical attenuators with fixed optical attenuation while adjusting the optical attenuation. As a result, corresponding to the forgoing, a dedicated facility or the like is not needed and the process is simplified, whereby it is possible to reduce the production cost.

Further, since the module is provided with the control device that automatically adjusts an optical attenuation of the variable optical attenuator corresponding to switching of each of the optical switches, it is made possible to automatically control the operation of the variable optical attenuator and to always hold a loss of the entire optical dispersion compensating module at a constant value. As a result, it is possible to operate the variable optical dispersion compensating module momentarily without requiring manual operation.

A bobbin around which the DC fiber is wound will be described below.

With reference to FIGS. 5A to 10, examples of the bobbin around which the optical dispersion compensating fibers are wound in the present invention will be described below. In addition, the examples are explained with the same members as in FIG. 1 assigned the same reference numerals as in FIG. 1.

DC fibers 10a to 10e with respective predetermined lengths are wound around, for example, an aluminum bobbin 30 as shown FIG. 5A, FIG. 5B and FIGS. 6 to 10 so as to obtain respective predetermined optical dispersion compensating amount, and the aluminum bobbin 30 is fixed to a housing using screws or the like to be accommodated therein.

Figure 5A:
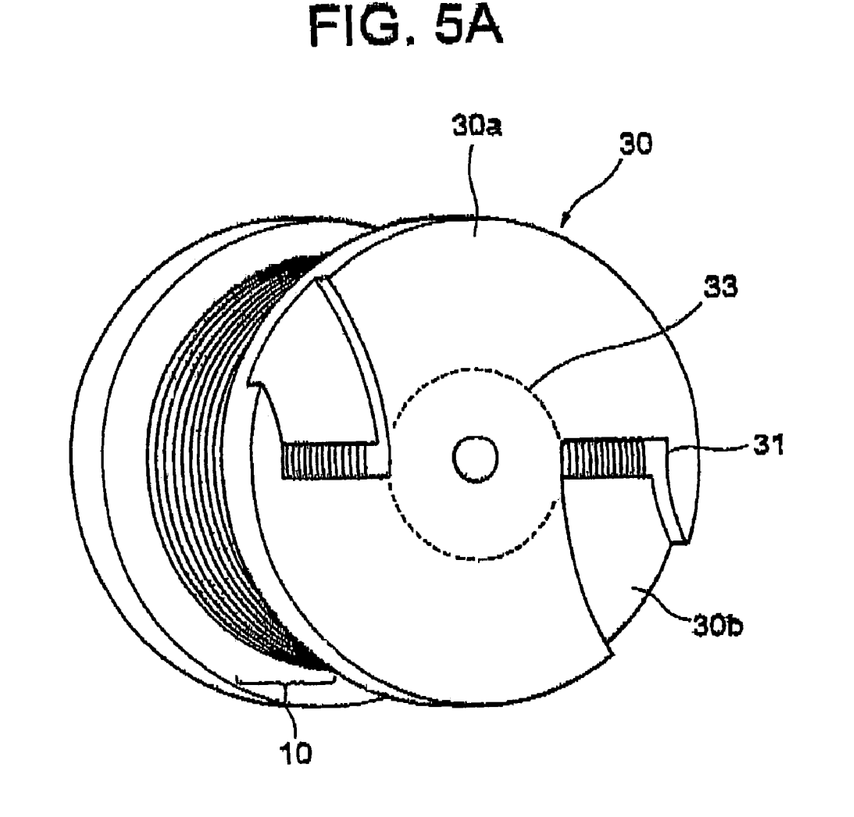
FIG. 5A is a perspective view of an example of a bobbin around which an optical dispersion fiber is wounded according to the present invention.
Figure 5B:
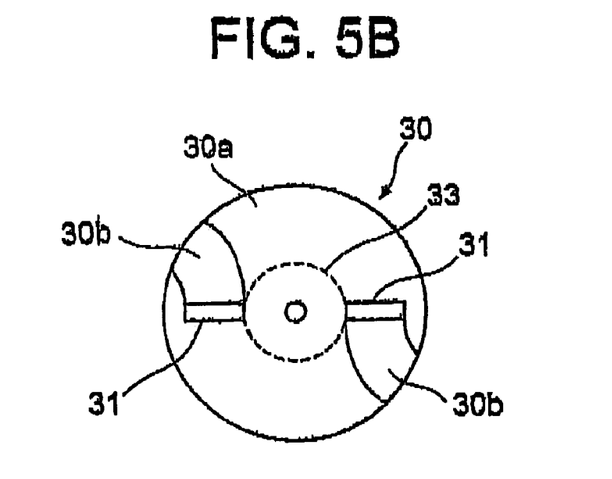
FIG. 5B is a plan view of a flange portion of the bobbin shown in FIG. 5A.

FIG. 5A shows a perspective view of a bobbin with a fiber insertion hole provided in one of flange portions of the bobbin, and FIG. 5B shows a plan view of the flange portion.

The bobbin 30 shown in FIG. 5A has a fiber insertion hole 31 formed in a flange portion 30a that is one of flange portions on opposite ends of a barrel portion 33. The insertion hole 31 is formed in the direction from the center of the bobbin 30 to outside. This structure makes it possible that the wound DC fiber optically couples with a part disposed outside the bobbin 30, for example, an optical switch, from any direction in the circumference. In other words, the DC fiber is capable of coupling with an optical switch with an arbitrary length. Further, a fiber guide groove 30b is formed on a surface of the flange portion 30a in the direction from the insertion hole 31 to outside. Since a thickness of the flange portion 30a is about 1.5 mm, a depth of the groove 30b may be about 1.0 mm. The groove is to avoid an external stress applied to the DC fiber in stacking bobbins 30 to place.

Figure 6:
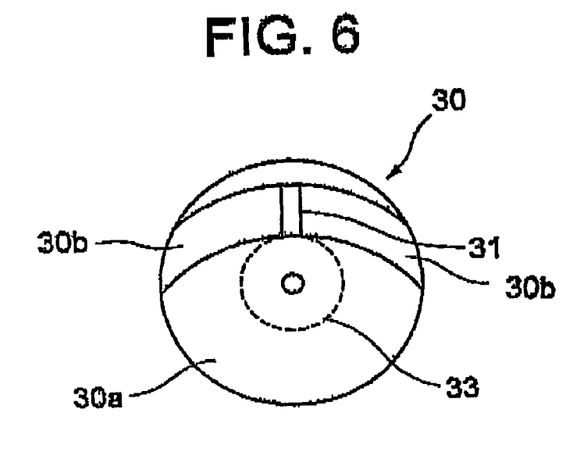
FIG. 6 is a plan view of a flange portion showing another example of the bobbin.

FIG. 6 shows another example of the bobbin with a different form. The functional effect is the same as in the bobbin shown in FIG. 5A.

Figure 7:
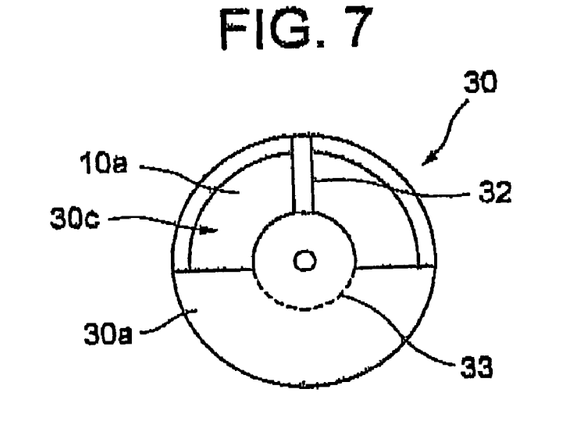
FIG. 7 is a plan view of a flange portion showing another example of the bobbin.
Figure 8:
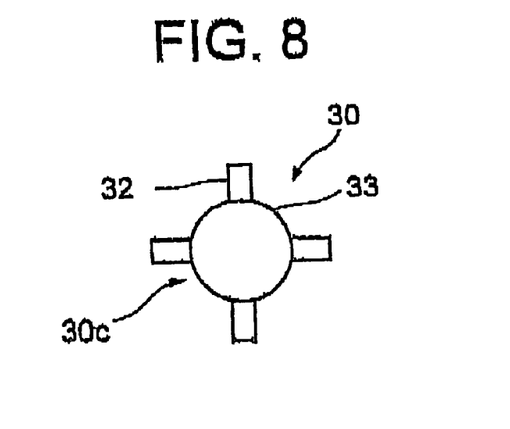
FIG. 8 is a plan view of a flange portion showing another example of the bobbin.

FIGS. 7 and 8 show another examples of the bobbin, where the insertion hole shown in FIG. 5A or FIG. 6 is not formed, and a flange portion 32 that is one of the flange portions is in a form of a cross to form an insertion portion 30c. The insertion portion 30c, i.e., gaps between the cross, exhibits the functions of the insertion hole and fiber guide groove explained in FIG. 5A.

In the bobbins with structures as shown in FIGS. 5A to 8, it is possible to wind several kinds of DC fibers with different lengths around a single bobbin. The function will be described using FIGS. 1 and 5A. The DC fiber 10a with a predetermined length is wound around the bobbin 30, and a front end of the DC fiber 10a is pulled out of the insertion hole 30 of the flange portion to be connected to the optical switch 12b. A rear end of the DC fiber 10b is connected to the optical switch 12b, and is wound around the bobbin 30 by a predetermined length, and the front end of the DC fiber 10b is pulled out of the insertion hole 31. DC fibers 10c, 10d and 10e are thus connected in this order.

In such a structure, it is possible to wind DC fibers with five different lengths around a single bobbin 30. As a result, while in general a single bobbin is used for DCF with a single kind of length, DC fibers with four different lengths are further wound around the single bobbin, resulting in cost reduction and miniaturization. In addition, it is preferable to provide connectors on the front and rear ends of each of the DC fibers to facilitate the connection. Further, while in the above embodiment DC fibers with five different lengths are wound around a single bobbin, the present invention is not limited to the above case. DC fibers with a few different lengths may be wound around a single bobbin.

Figure 9:
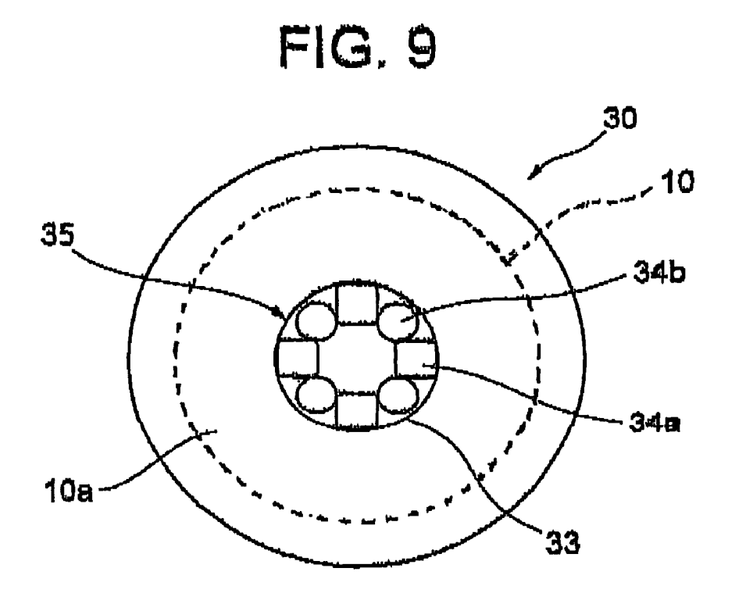
FIG. 9 is a plan view of a flange portion showing another example of the bobbin.
Figure 10:
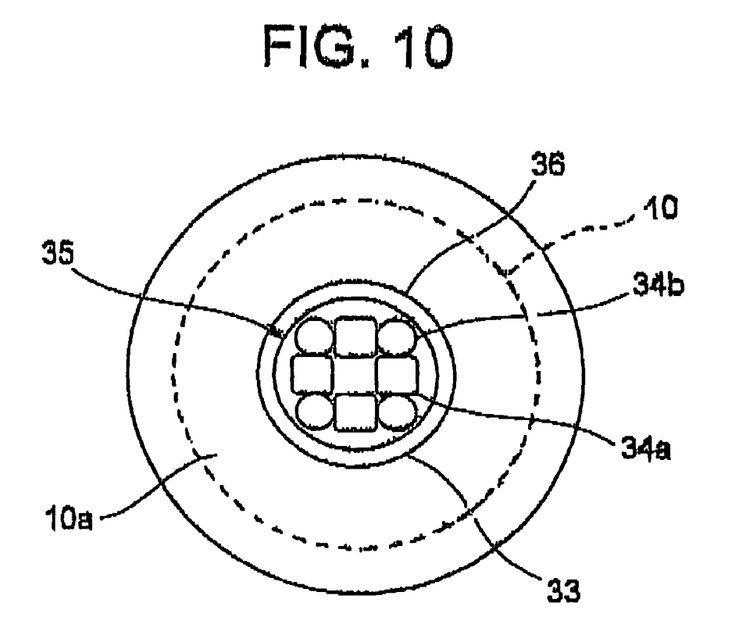
FIG. 10 is a plan view of a flange portion showing another example of the bobbin.

With reference to FIGS. 9 and 10, examples modified from FIGS. 5A to 8 in the embodiments of the present invention will be described below. In addition, the examples are explained with the same members as in FIG. 1 assigned the same reference numerals as in FIG. 1.

As shown in FIG. 9, the barrel portion 33 may be composed of one or a plurality of support poles 34a and one or a plurality of expanding/shrinking axes 34b. FIG. 9 shows a structure with four expanding/shrinking axes 34b and four support poles 34a. In winding DC fibers, it is necessary to wind the fibers so that the fibers near barrel portion 33 are not stressed by the outer fibers. At first, the diameter of the expanding/shrinking axes 34b is set at a little larger than the diameter of the support pole 34a, and then the fibers are wound around the axes. After winding, the diameter of the expanding/shrinking axes 34b is lessened to the diameter of the support pole 34a. The fiber inner circumference surface 35 is supported by the expanding/shrinking axes 34b and support poles 34a, and the inner circumference surface of the wound fiber forms almost a circular shape. At this point, in order to prevent a partial stress from being applied to the fiber, it is preferable that an outer surface of each of the support poles 34a forms a curved surface. In addition, while FIG. 9 shows the structure example with four expanding/shrinking axes 34b and four support poles 34a, the present invention is not limited to the above example, and is applicable to structures with three or more axes and poles. In addition, a larger number prevents a stress from being applied locally to the fiber to a more extent, and therefore provides a preferable structure. Using a bobbin with such a structure decreases a loss amount and improves wavelength characteristics of a loss.

Further, as shown in FIG. 10, a tube 36 with a smooth surface may be provided between the expanding/shrinking axes 34b and support poles 34a, and the inner circumference surface of the wound fiber. The tube 36 has a structure enabling its diameter to be expanded and shrunk, and for example, is obtained by forming a sheet-shaped material in the form of a tube. Accordingly, the above-mentioned bobbin is provided with flange portions on opposite ends of the barrel portion 33 composed of a plurality of support poles and expanding/shrinking axes and thereby enables a diameter thereof to be expanded or shrunk.

In the foregoing, the present invention is explained using the embodiments, but is not limited to the embodiments, and includes any combination of the embodiments as appropriate by those skilled in the art. The present invention is different from the conventional art, in particular, decreases the number of optical attenuators, provides an optical dispersion compensating apparatus that controls or compensates for an optical dispersion amount using only a single attenuator that is the minimum number, and in this respect, exhibits excellent effects.

What is claimed is:

1. A variable optical dispersion compensating module comprising:
   (a) an optical dispersion compensating unit comprising: an input switch, a bypass path, a loop optical dispersion compensating fiber having a predetermined optical dispersion amount, an output switch, and said bypass and said loop fiber being connected to said input switch and to said output switch;

(b) a plurality of said units connected in series;
(c) an input connector located at the input to the variable optical dispersion compensating units;
(d) an output connector located at the output of the variable optical dispersion compensating units;
(e) a single optical attenuator provided between said input connector and said output connector; and
(f) a control device that is connected to the optical attenuator and connected to said input and output switches of said plurality of said units to read switching states of said switches and control said optical attenuator based on the read switching states.

2. The variable optical dispersion compensating module according to claim 1, wherein, instead of said input and output switch, a single optical switch is provided at a midpoint in said bypass path, which operates as said input optical switch and said output optical switch and is connected to said optical compensating fiber.

3. The variable optical dispersion compensating module according to claim 1, wherein with respect to an optical dispersion amount of said optical dispersion compensating fiber composing said optical dispersion compensating unit, when an optical dispersion amount of one optical dispersion compensating fiber is set at X, a negative optical dispersion amount of another optical dispersion compensating fiber is set at $2^N \times X$ (N is an integer ranging from 1 to j).

4. The variable optical dispersion compensating module according to claim 2, wherein with respect to an optical dispersion amount of said optical dispersion compensating fiber composing said at least one of said optical dispersion compensating unit, when an optical dispersion amount of a specific optical dispersion compensating fiber is set at X, a negative optical dispersion amount of another optical dispersion compensating fiber is set at $2^N \times X$ (N is an integer ranging from 1 to j).

5. The variable optical dispersion compensating module according to claim 1, wherein the single optical attenuator adjusts loss of the entire variable optical dispersion compensating module.

6. The variable optical dispersion compensating module according to claim 1, wherein the input and output optical switches are selected to switch an optical path so that said loop optical dispersion compensating fiber having a desired optical dispersion compensating amount is selected.

7. The variable optical dispersion compensating module according to claim 1, wherein the control device is configured to calculate a loss of the entire variable optical dispersion compensating module corresponding to the switching states of the switches, and use a calculated result to automatically adjust the optical attenuation of the variable optical attenuator.

8. The variable optical dispersion compensating module according to claim 1, further comprising a bobbin, having a barrel portion on whose opposite ends are provided flange portions, one of which is provided with a fiber insertion hole which is formed in a direction from a center of said bobbin to an outside of said bobbin, and said optical dispersion compensating fiber is wound around said bobbin, wherein said barrel portion having a plurality of support poles and a plurality of expanding/shrinking axes, and a diameter of the expanding/shrinking axes changes from a first diameter which is larger than that of said support poles to a second diameter which is smaller than the first diameter.

9. The variable optical dispersion compensating module according to claim 1, further comprising a bobbin, having a barrel portion on whose opposite ends are provided flange portions, one of which is provided with a fiber insertion hole which is formed in a straight line extending radially in a direction from a center of said bobbin to an outside of said bobbin, and said optical dispersion compensating fiber is wound around said bobbin.

10. The variable optical dispersion compensating module according to claim 1, further comprising a bobbin, having a barrel portion on whose opposite ends are provided flange portions, one of which is provided with a fiber insertion hole which is formed in a straight line extending radially in a direction from a center of said bobbin to an outside of said bobbin, and said optical dispersion compensating fiber is wound around said bobbin, wherein a fiber guide groove is formed on a surface of the one of the flange portions so as to extend from the fiber insertion hole to an outside of the bobbin.

* * * * *